United States Patent
Katsuyama

(10) Patent No.: US 11,126,021 B2
(45) Date of Patent: Sep. 21, 2021

(54) SEMICONDUCTOR OPTICAL DEVICE AND METHOD FOR MANUFACTURING THE SAME

(71) Applicant: SUMITOMO ELECTRIC INDUSTRIES, LTD., Osaka (JP)

(72) Inventor: Tomokazu Katsuyama, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/985,057

(22) Filed: Aug. 4, 2020

(65) Prior Publication Data
US 2021/0041726 A1 Feb. 11, 2021

(30) Foreign Application Priority Data
Aug. 7, 2019 (JP) .............................. JP2019-145772

(51) Int. Cl.
*G02F 1/017* (2006.01)
*G02F 1/225* (2006.01)
*G02F 1/21* (2006.01)

(52) U.S. Cl.
CPC ........ *G02F 1/01708* (2013.01); *G02F 1/2257* (2013.01); *G02F 1/212* (2021.01); *G02F 2201/063* (2013.01)

(58) Field of Classification Search
CPC .... G02F 1/01708; G02F 1/2257; G02F 1/212; G02F 2201/063; G02F 1/015; G02B 6/13; G02B 6/131; G02B 6/132; G02B 6/136; G02B 2006/12173
See application file for complete search history.

(56) References Cited

U.S. PATENT DOCUMENTS

| | | | |
|---|---|---|---|
| 8,986,553 B2* | 3/2015 | Kitamura | G02F 1/2257 216/2 |
| 2015/0185582 A1* | 7/2015 | Kwakernaak | G02F 1/2257 438/69 |

FOREIGN PATENT DOCUMENTS

JP H11-251686 9/1999

* cited by examiner

*Primary Examiner* — John Bedtelyon
(74) *Attorney, Agent, or Firm* — Smith, Gambrell & Russell, LLP.

(57) ABSTRACT

A method for manufacturing a semiconductor optical device includes the steps of forming a first semiconductor layer on a substrate; forming a mask on the first semiconductor layer; forming a first mesa from the first semiconductor layer using the mask; forming an embedding layer on a portion of the first semiconductor layer that is exposed from the mask such that the first mesa is embedded in the embedding layer; and forming a second mesa from the first mesa.

9 Claims, 13 Drawing Sheets

SEMICONDUCTOR OPTICAL DEVICE AND METHOD FOR MANUFACTURING THE SAME

CROSS REFERENCES TO RELATED APPLICATIONS

The present disclosure contains subject matter related to Japanese Patent Application No. 2019-145772 filed in the Japan Patent Office on Aug. 7, 2019, the entire contents of which are incorporated herein by reference.

BACKGROUND OF THE INVENTION

1. Field of the Invention

The present disclosure relates to semiconductor optical devices and methods for manufacturing semiconductor optical devices.

2. Description of the Related Art

Optical modulators formed of semiconductor layers and configured to modulate light have been developed (see, for example, Japanese Unexamined Patent Application Publication No. 11-251686).

SUMMARY OF THE INVENTION

A semiconductor optical device includes an embedding layer having embedded therein a mesa including, for example, a core layer. A mask is provided on a portion on which the embedding layer is not to be deposited, including the mesa, and the embedding layer is grown on a portion on which the mask is not provided. However, the embedding layer may also grow on the mask. The growth of the embedding layer on the mask would hinder the subsequent process. Accordingly, an object of the present disclosure is to provide a semiconductor optical device in which the growth of an embedding layer on a mask can be inhibited and a method for manufacturing such a semiconductor optical device.

A method for manufacturing a semiconductor optical device according to one aspect of the present disclosure includes the steps of forming a first semiconductor layer on a substrate; forming a mask on the first semiconductor layer; forming a first mesa from the first semiconductor layer using the mask; forming an embedding layer on a portion of the first semiconductor layer that is exposed from the mask such that the first mesa is embedded in the embedding layer; and forming a second mesa from the first mesa.

A semiconductor optical device according to another aspect of the present disclosure includes a substrate; a trapezoidal mesa formed on the substrate; and an arm waveguide formed on the trapezoidal mesa and having a high-mesa structure. The arm waveguide includes a semiconductor layer including a core layer.

DESCRIPTION OF THE PREFERRED EMBODIMENTS

Description of Embodiments of the Disclosure

Figure 1A:
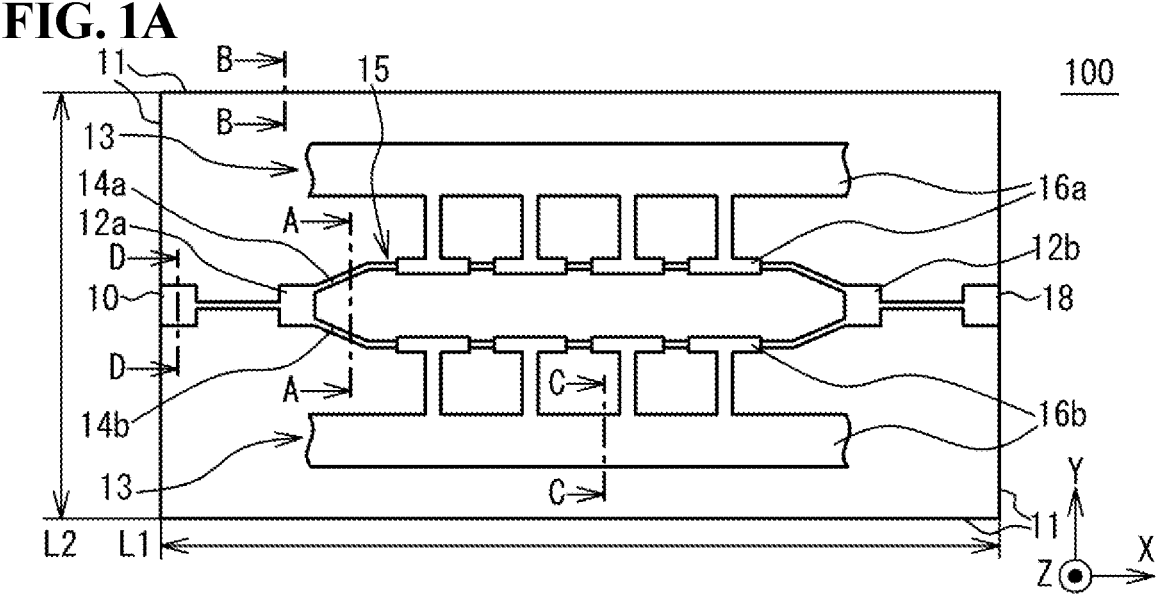
FIG. 1A is a plan view illustrating an example semiconductor optical device according to a first embodiment.

First, embodiments of the present disclosure will be listed and described.

(1) One embodiment of the present disclosure is a method for manufacturing a semiconductor optical device, including the steps of forming a first semiconductor layer on a substrate; forming a mask on the first semiconductor layer; forming a first mesa from the first semiconductor layer using the mask; forming an embedding layer on a portion of the first semiconductor layer that is exposed from the mask such that the first mesa is embedded in the embedding layer; and forming a second mesa from the first mesa. Because the embedding layer is formed over a large area, including both sides of the first mesa, the area of the mask may be small. Thus, the growth of the embedding layer on the mask can be inhibited.

(2) The area of the mask may be 25% or less of the area of the substrate. Because the area of the mask is small, the growth of the embedding layer on the mask can be inhibited.

(3) The step of forming the embedding layer may be a step of forming a compound semiconductor layer as the embedding layer by organometallic vapor phase epitaxy.

(4) The first semiconductor layer may include, in sequence, a lower cladding layer, a core layer, and an upper cladding layer, and the embedding layer may be formed on the lower cladding layer. Because the embedding layer is a semiconductor layer, the embedding layer grows easily on the lower cladding layer, which is a semiconductor layer, but does not grow on the mask.

(5) The method may further include a step of forming a second semiconductor layer on the first semiconductor layer and the embedding layer, and the second mesa may be formed from the first mesa and the second semiconductor layer. Because the second semiconductor layer is provided on a flat surface formed by the embedding layer and the first mesa, the flatness of the semiconductor optical device is improved.

(6) The method may further include a step of implanting ions into the first semiconductor layer after the step of forming the embedding layer and before the step of forming the second mesa. Because ions are implanted into a flat surface formed by the embedding layer and the first mesa, the depth of implantation becomes more uniform.

(7) The first mesa and the second mesa may be formed in regions of the semiconductor optical device in which an arm waveguide, a scribe line, and an electrode are to be formed and in a portion of the semiconductor optical device that is to become a spot-size converter, and the method may further include a step of removing the embedding layer from the waveguide and the scribe line after the step of forming the second mesa. Because the embedding layer is provided over a large area, the area of the mask can be reduced. Thus, the growth of the embedding layer on the mask can be inhibited. In addition, because the embedding layer is removed from the waveguide, the light modulation efficiency is improved. Because the embedding layer is removed from the scribe line, it is easy to perform, for example, cleavage.

(8) Another embodiment of the present disclosure is a semiconductor optical device including a substrate; a trapezoidal mesa formed on the substrate; and an arm waveguide formed on the trapezoidal mesa and having a high-mesa structure. The arm waveguide includes a semiconductor layer including a core layer. Thus, light is less likely to leak from the arm waveguide.

(9) The semiconductor optical device may further include a region in which an electrode is formed over the substrate; and an embedding layer formed on the substrate. The region in which the electrode is formed may include a plurality of first mesas formed on the substrate and the embedding layer. The embedding layer is formed between the plurality of first mesas. Thus, the electrode can be stably provided.

(10) The semiconductor optical device may further include a spot-size converter formed on the substrate and optically coupled to the arm waveguide. The spot-size converter may have a mesa shape with the core layer on one side and the embedding layer on the opposite side. The spot-size converter can expand light.

Details of Embodiments of the Disclosure

Specific examples of semiconductor optical devices and methods for manufacturing semiconductor optical devices according to embodiments of the present disclosure will hereinafter be described with reference to the drawings. It should be understood, however, that the disclosure is not limited to these examples, but is indicated by the claims, and all changes that come within the meaning and range of equivalency of the claims are intended to be embraced therein.

FIRST EMBODIMENT

Optical Modulator

FIG. 1A is a plan view illustrating an example semiconductor optical device 100 according to a first embodiment. As shown in FIG. 1A, the semiconductor optical device 100 includes spot-size converters 10 and 18, a Mach-Zehnder modulator 15, a splitter 12a, and a combiner 12b. The Mach-Zehnder modulator 15 includes arm waveguides 14a and 14b and electrodes 16a and 16b. The X-axis direction is the direction in which the arm waveguides 14a and 14b extend. The Y-axis and the Z-axis are orthogonal to the X-axis. The Z-axis direction is the direction in which layers, such as semiconductor layers and masks, are stacked on top of each other.

Scribe lines 11 are provided at the ends of the semiconductor optical device 100. The wafer is cleaved along the scribe lines 11 to form each chip of the semiconductor optical device 100. The length L1 of the long sides of the semiconductor optical device 100 is, for example, 2 mm. The length L2 of the short sides of the semiconductor optical device 100 is, for example, 1 mm. The spot-size converter 10 is disposed at one end of the semiconductor optical device 100. The spot-size converter 18 is disposed at the opposite end of the semiconductor optical device 100 and is opposed to the spot-size converter 10.

The spot-size converter 10 and the spot-size converter 18 are connected to each other via the splitter 12a, the combiner 12b, and waveguides. The two arm waveguides 14a and 14b of the Mach-Zehnder modulator 15 are coupled to the splitter 12a and the combiner 12b. For example, the arm waveguides 14a and 14b are parallel to and separated from each other. The spot-size converter 10 is optically coupled to the arm waveguides 14a and 14b via the splitter 12a and a waveguide. The spot-size converter 18 is optically coupled to the arm waveguides 14a and 14b via the combiner 12b and a waveguide.

The electrodes 16a and 16b are disposed in two regions 13 of the semiconductor optical device 100. The electrode 16a partially overlaps the arm waveguide 14a, whereas the electrode 16b partially overlaps the arm waveguide 14b.

The arm waveguides 14a and 14b, the regions 13, the splitter 12a, the combiner 12b, and the spot-size converters 10 and 18 include a stacked structure of semiconductor layers. The stacked structure forms mesas. For example, the mesas are covered by an insulating film (not shown) and are embedded in a resin such as benzocyclobutene (BCB) resin. The resin and the insulating film are not shown in sectional views.

Figure 1B:
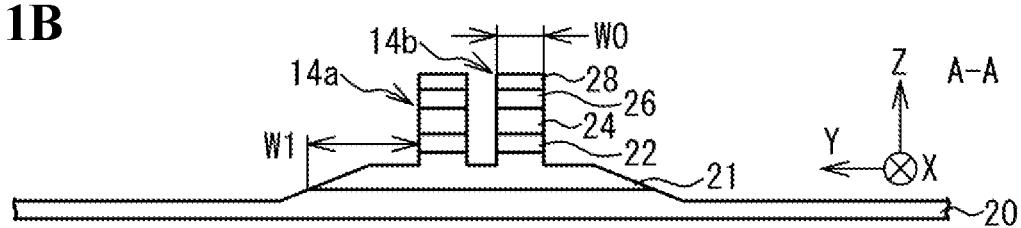
FIG. 1B is a sectional view illustrating the example semiconductor optical device.
Figure 1C:
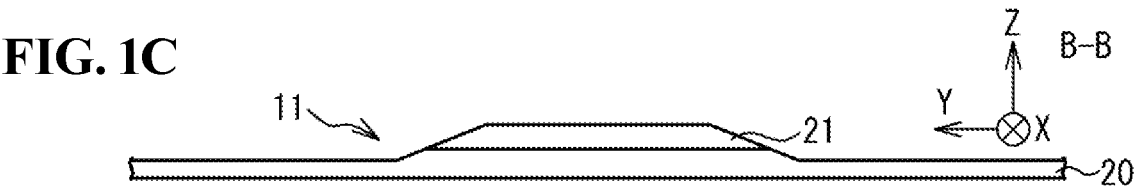
FIG. 1C is a sectional view illustrating the example semiconductor optical device.
Figure 1D:
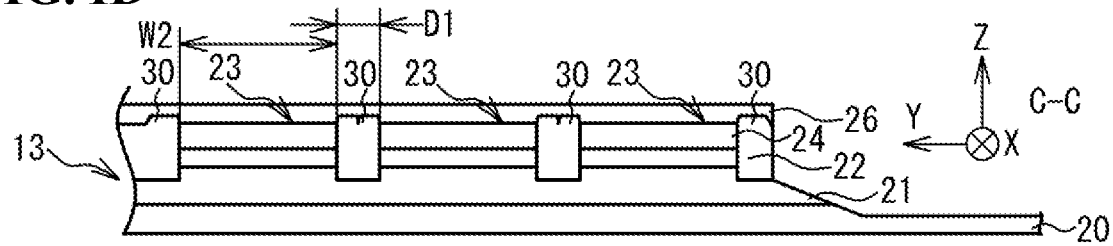
FIG. 1D is a sectional view illustrating the example semiconductor optical device.
Figure 1E:
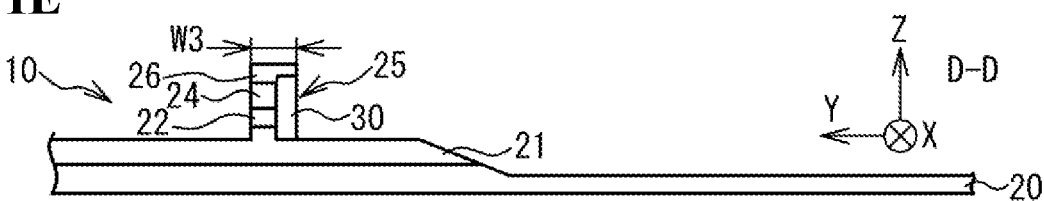
FIG. 1E is a sectional view illustrating the example semiconductor optical device.

FIGS. 1B to 1D are sectional views illustrating the example semiconductor optical device 100. FIG. 1B illustrates a cross-section of the arm waveguides 14a and 14b taken along line A-A in FIG. 1A. FIG. 1C illustrates a cross-section of the scribe lines 11 taken along line B-B in FIG. 1A. FIG. 1D illustrates a cross-section of the regions 13 taken along line C-C in FIG. 1A. FIG. 1E illustrates a cross-section of the spot-size converter 10 taken along line D-D in FIG. 1A. For simplicity of illustration, hatching is not shown in sectional views.

As shown in FIG. 1B, the arm waveguides 14a and 14b are waveguides having a high-mesa structure, each including a cladding layer 21 (lower cladding layer), a core layer 22, cladding layers 24 and 26 (upper cladding layer), and a contact layer 28 stacked in sequence on the substrate 20. The width W0 of each arm waveguide is, for example, 1.5 µm. The substrate 20 and the cladding layer 21 form, for example, a trapezoidal mesa. The trapezoidal mesa has a flat upper surface formed by the cladding layer 21 and inclined surfaces formed by the cladding layer 21 and the substrate 20. The width W1 of the cladding layer 21 on one side of each arm waveguide is, for example, 30 µm. The cladding layer 21 connects the arm waveguides 14a and 14b together. The electrodes 16a and 16b, which are not shown in FIG. 1B, are disposed on the contact layer 28.

As shown in FIG. 1C, the scribe lines 11 include a mesa formed by the substrate 20 and the cladding layer 21 and does not include the core layer 22, the cladding layers 24 and 26, or the contact layer 28.

As shown in FIG. 1D, the regions 13 include a plurality of mesas 23 and an embedding layer 30. Although three mesas 23 are shown in FIG. 1D, two mesas 23 or four or more mesas 23 may be provided. The mesas 23 are formed by the cladding layer 21, the core layer 22, and the cladding layer 24. The plurality of mesas 23 are connected together via the cladding layer 21. The plurality of mesas 23 are separated from each other, with the embedding layer 30 disposed between the mesas 23. The mesas 23 and the embedding layer 30 are alternately arranged in the Y-axis direction. Very small depressions are formed in the centers of the upper portions of the embedding layer 30 between the mesas 23. The cladding layer 26 is disposed on the mesas 23 and the embedding layer 30. The width W2 of each mesa 23 is, for example, 50 µm. The distance D1 between the adjacent mesas 23 is, for example, 10 µm. The electrode 16a or 16b, which is not shown in FIG. 1D, is disposed on the cladding layer 26.

As shown in FIG. 1E, the spot-size converter 10 has a mesa 25 formed by the cladding layer 21, the core layer 22, the cladding layers 24 and 26, and the embedding layer 30. The width W3 of the mesa 25 is, for example, 5 µm. The mesa 25 has the embedding layer 30 on one side and the cladding layer 21, the core layer 22, and the cladding layer 24 on the opposite side in the Y-axis direction. The cladding layer 26 is disposed on the embedding layer 30 and the cladding layer 24. The spot-size converter 18 has the same structure as the spot-size converter 10.

The substrate 20 is, for example, a semi-insulating semiconductor substrate formed of iron (Fe)-doped indium phosphide (InP). The cladding layer 21 is formed of, for example, an n-type InP layer with a thickness of 500 nm. The core layer 22 has, for example, a multiple quantum well (MQW) structure including aluminum gallium indium arsenide (AlGaInAs) and AlInAs. The core layer 22 has a thickness of, for example, 500 nm. The cladding layer 24 is formed of, for example, an undoped InP layer with a thickness of 180 nm and a p-type InP layer with a thickness of 500 nm. The cladding layer 26 is formed of, for example, a p-type InP layer with a thickness of 500 nm. The contact layer 28 is formed of, for example, a p-type InGaAs layer with a thickness of 200 nm. The embedding layer 30 is, for example, a stack of an InP layer with a thickness of 100 nm and an InGaAsP layer with a thickness of 15 nm.

Method of Manufacture

Figure 2A:
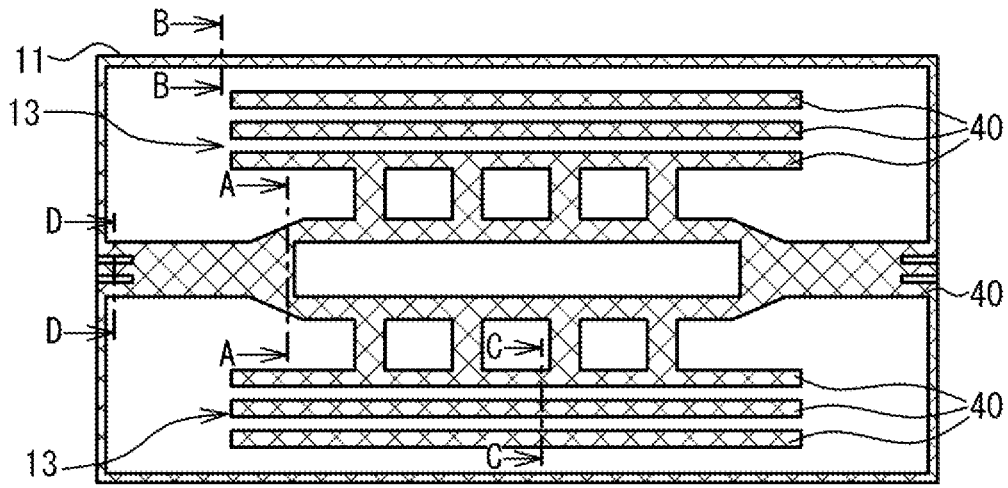
FIG. 2A is a plan view illustrating an example method for manufacturing a semiconductor optical device.
Figure 6:
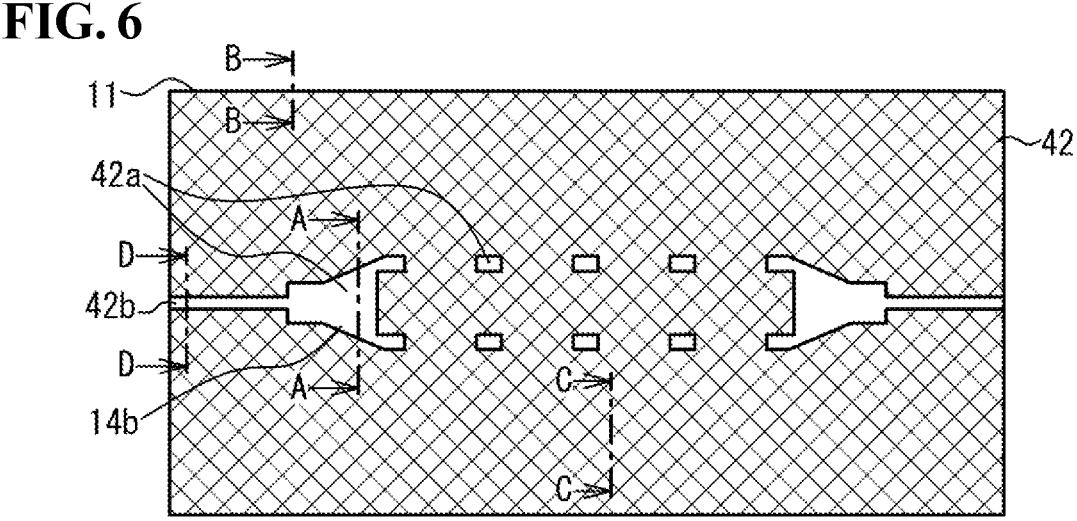
FIG. 6 is a plan view illustrating the example method for manufacturing a semiconductor optical device.
Figure 8A:
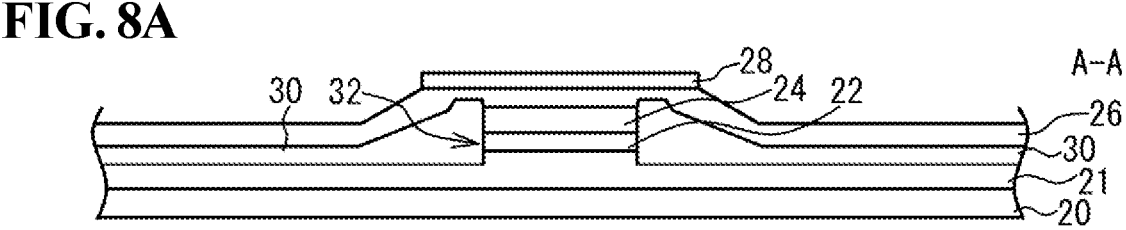
FIG. 8A is a sectional view illustrating the example method for manufacturing a semiconductor optical device.
Figure 8B:
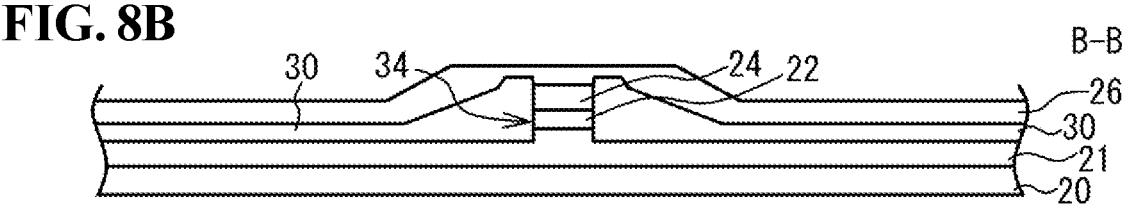
FIG. 8B is a sectional view illustrating the example method for manufacturing a semiconductor optical device.
Figure 8C:
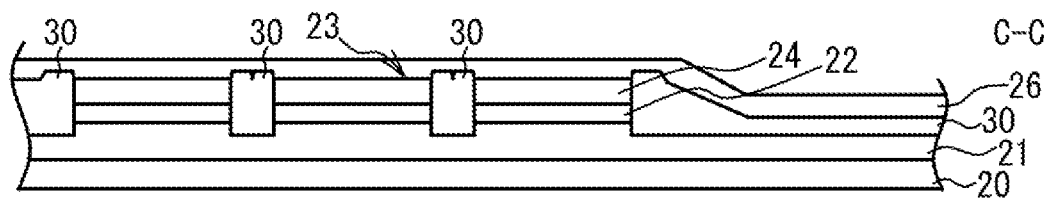
FIG. 8C is a sectional view illustrating the example method for manufacturing a semiconductor optical device.
Figure 8D:
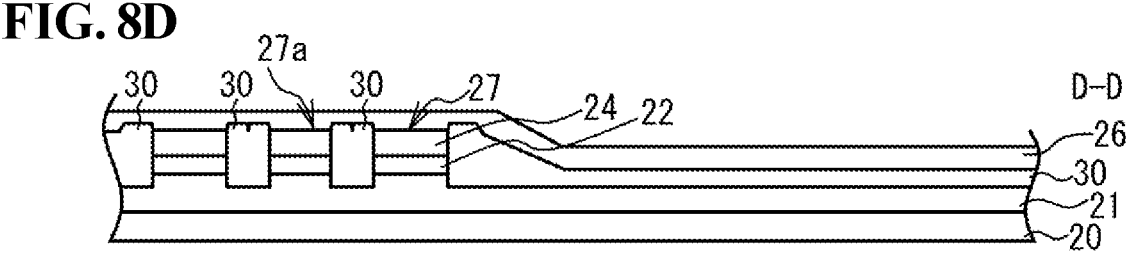
FIG. 8D is a sectional view illustrating the example method for manufacturing a semiconductor optical device.
Figure 9:
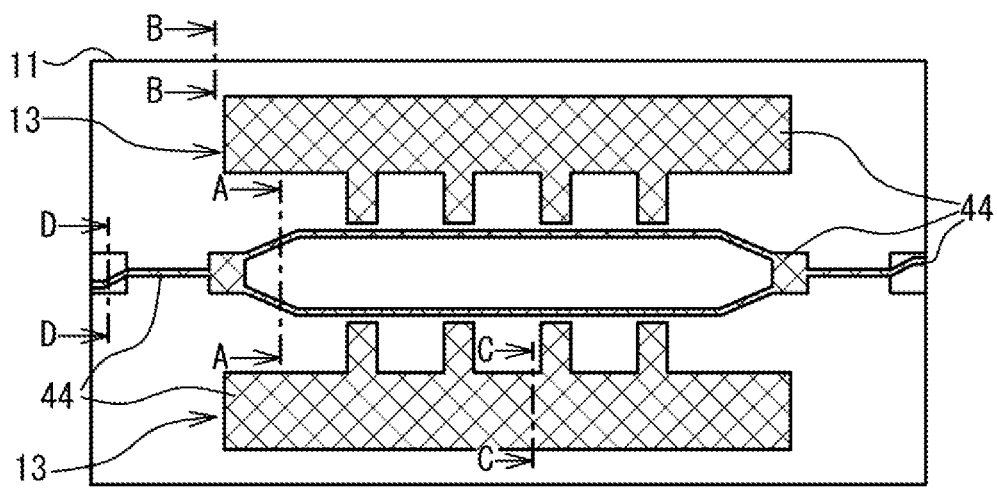
FIG. 9 is a plan view illustrating the example method for manufacturing a semiconductor optical device.

FIGS. 2A, 6, and 9 are plan views illustrating an example method for manufacturing the semiconductor optical device 100. Lines A-A, B-B, C-C, and D-D in these figures are located at the same positions as those in FIG. 1A. FIGS. 2B to 5D, FIGS. 7A to 8D, and FIGS. 10A to 11D are sectional views illustrating the example method for manufacturing the semiconductor optical device 100. These sectional views illustrate cross-sections taken along lines A-A, B-B, C-C, and D-D.

As shown in FIGS. 2B to 2E, the cladding layer 21, the core layer 22, and the cladding layer 24 (first semiconductor layer) are epitaxially grown on the (100) plane of the substrate 20, for example, by organometallic vapor phase epitaxy (OMVPE). An insulator mask 40 is further formed on the cladding layer 24. In plan views, masks are indicated by cross-hatching.

Figure 2B:
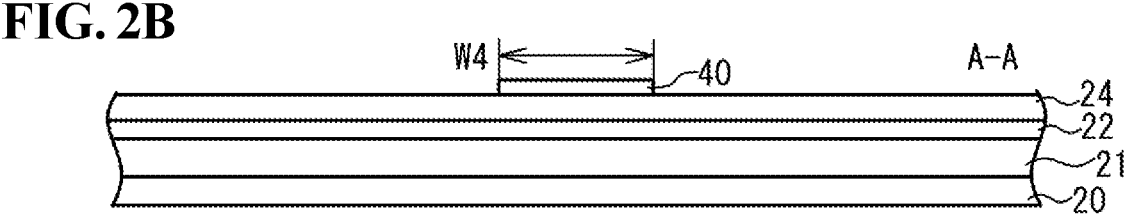
FIG. 2B is a sectional view illustrating the example method for manufacturing a semiconductor optical device.
Figure 2C:
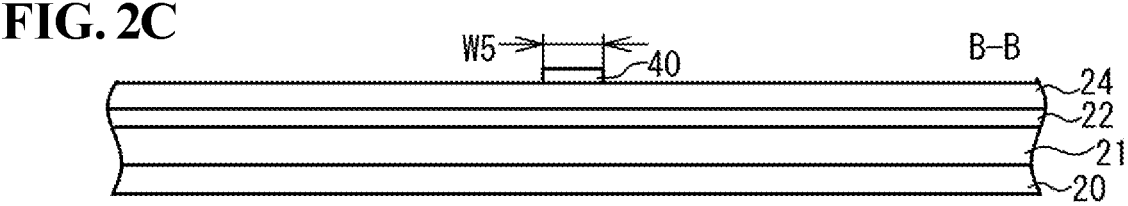
FIG. 2C is a sectional view illustrating the example method for manufacturing a semiconductor optical device.

As shown in FIG. 2A, the mask 40 covers the regions in which the arm waveguides 14a and 14b are to be formed, the regions 13 in which the electrodes 16a and 16b are to be formed, and the regions in which the scribe lines 11 and the spot-size converters 10 and 18 are to be formed. The area of the mask 40 is, for example, 0.5 mm², accounting for 25% of the area of the substrate 20. The width W4 of the mask 40 shown in FIG. 2B is, for example, greater than the sum of the widths of the two arm waveguides 14a and 14b. The width W4 of the mask 40 is, for example, 20 µm or more and 50 µm or less. The width W5 of the mask 40 shown in FIG. 2C is, for example, 10 µm.

Figure 2D:
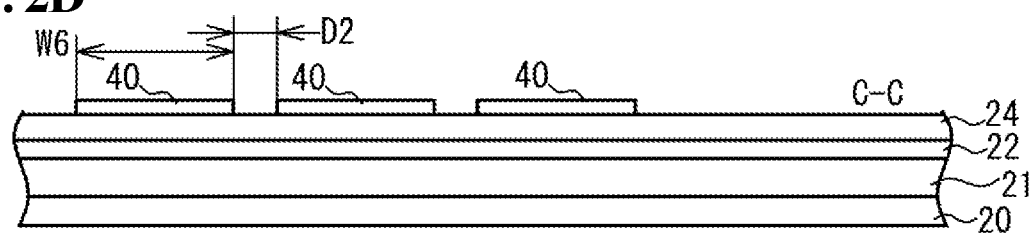
FIG. 2D is a sectional view illustrating the example method for manufacturing a semiconductor optical device.
Figure 2E:
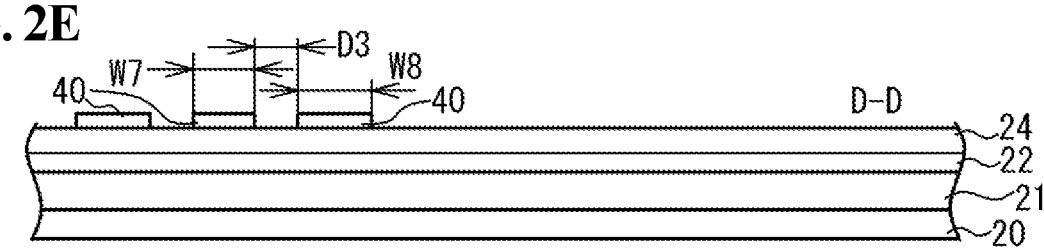
FIG. 2E is a sectional view illustrating the example method for manufacturing a semiconductor optical device.

As shown in FIGS. 2A and FIG. 2D, the mask 40 has a striped pattern in the regions 13. The width W6 of the mask 40 is, for example, 50 μm. The distance D2 between the adjacent stripe portions of the mask 40 is, for example, 10 μm. As shown in FIG. 2E, the mask 40 has a striped pattern. The width W7 of the mask 40 is, for example, 5 μm. The width W8 of the mask 40 is, for example, 10 μm. The distance D3 between the stripe portions of the mask 40 is, for example, 10 μm.

Figure 3A:
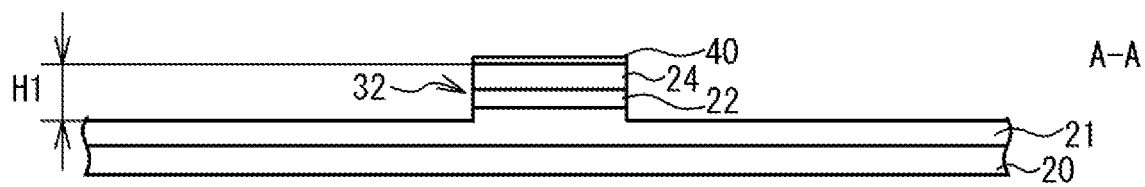
FIG. 3A is a sectional view illustrating the example method for manufacturing a semiconductor optical device.
Figure 3B:
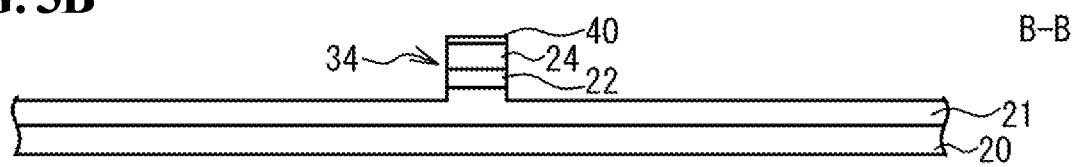
FIG. 3B is a sectional view illustrating the example method for manufacturing a semiconductor optical device.
Figure 3C:
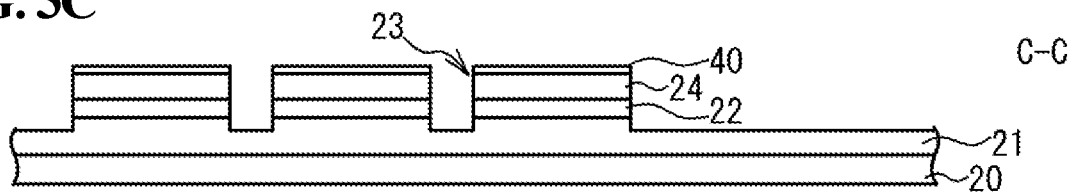
FIG. 3C is a sectional view illustrating the example method for manufacturing a semiconductor optical device.
Figure 3D:
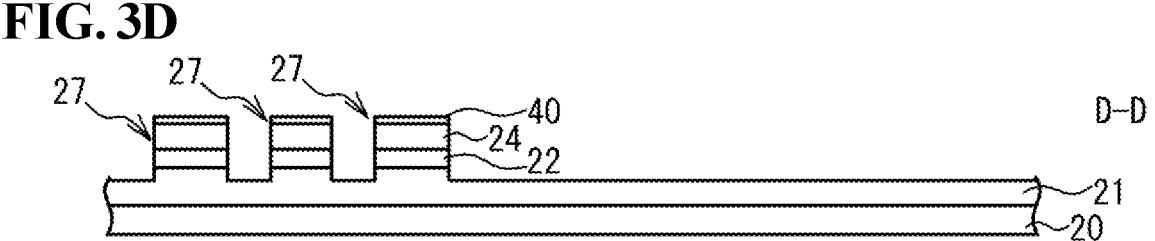
FIG. 3D is a sectional view illustrating the example method for manufacturing a semiconductor optical device.

As shown in FIGS. 3A to 3D, mesas 32 and 34, the plurality of mesas 23, and a plurality of mesas 27 (first mesa) are formed, for example, by dry etching. The dry etching proceeds to a certain depth within the cladding layer 21. The portions under the mask 40 form mesas without being etched. The height H1 of the mesa 32 shown in FIG. 3A is, for example, 3 μm, and the heights of the mesas 34, 23, and 27 are similar.

As shown in FIGS. 4A to 4D, the embedding layer 30 is epitaxially grown, for example, by OMVPE. The wafer is placed in a furnace, and source gases are supplied to the furnace. Example growth conditions are shown below:
Source gases: phosphine ($PH_3$), arsine ($AsH_3$), trimethylindium ($In(CH_3)_3$), and trimethylgallium ($Ga(CH_3)_3$)
Gas flow rate: the flow rate of a carrier gas, i.e., hydrogen, is 20 L/min Temperature: 600° C.
Pressure: 100 mbar The mask 40 is disposed on the mesas 32, 34, 23 and 27 during the growth of the embedding layer 30. The embedding layer 30 does not grow on the portions covered by the mask 40, but grows on the portions exposed from the mask 40. The embedding layer 30 does not grow easily on the surface of the mask 40 because the source gases flow over the mask 40. A large mask 40 may allow unnecessary embedding layer 30 to grow thereon. To inhibit the growth of the embedding layer 30 on the mask 40, it is preferred that the area of the mask 40 be 25% or less of the area of the substrate 20.

Figure 4A:
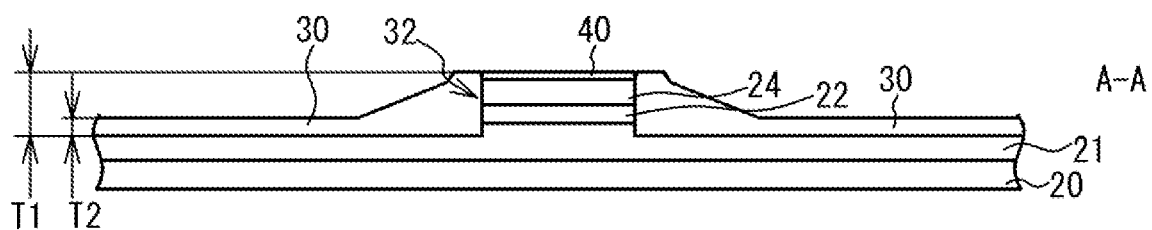
FIG. 4A is a sectional view illustrating the example method for manufacturing a semiconductor optical device.
Figure 4B:
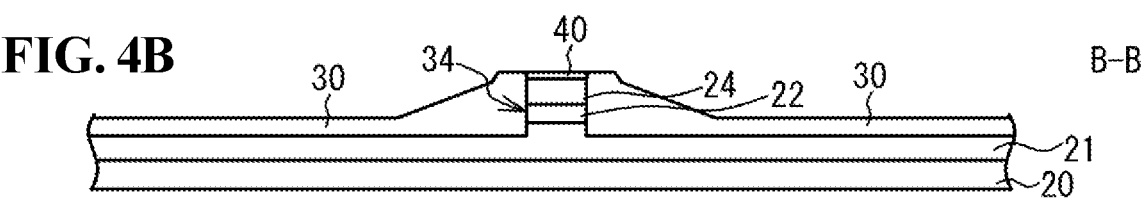
FIG. 4B is a sectional view illustrating the example method for manufacturing a semiconductor optical device.
Figure 4C:
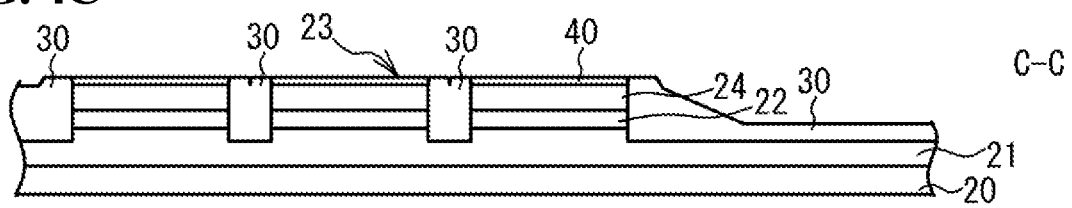
FIG. 4C is a sectional view illustrating the example method for manufacturing a semiconductor optical device.
Figure 4D:
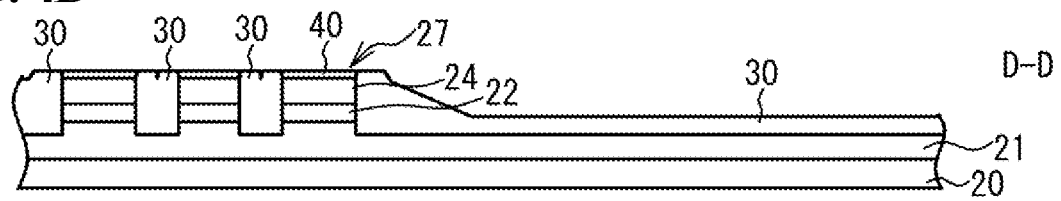
FIG. 4D is a sectional view illustrating the example method for manufacturing a semiconductor optical device.
Figure 5A:
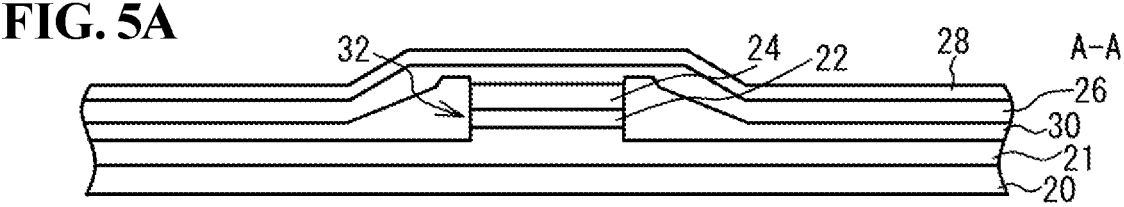
FIG. 5A is a sectional view illustrating the example method for manufacturing a semiconductor optical device.
Figure 5B:
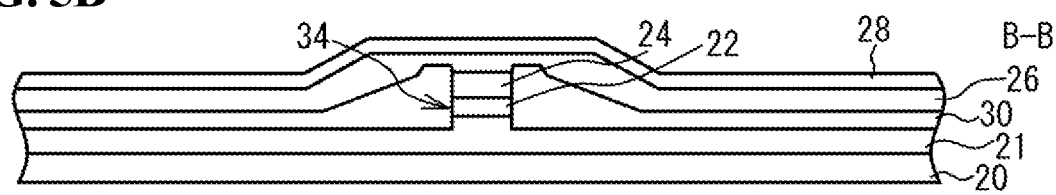
FIG. 5B is a sectional view illustrating the example method for manufacturing a semiconductor optical device.
Figure 5C:
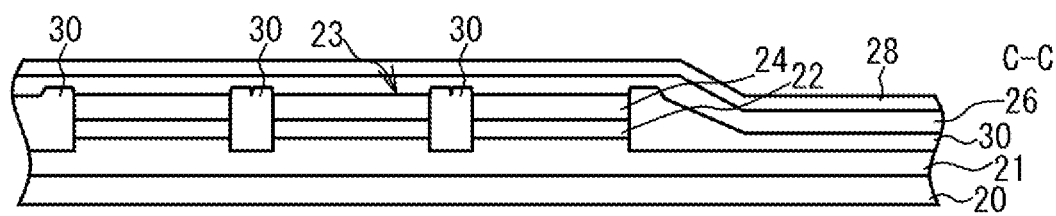
FIG. 5C is a sectional view illustrating the example method for manufacturing a semiconductor optical device.
Figure 5D:
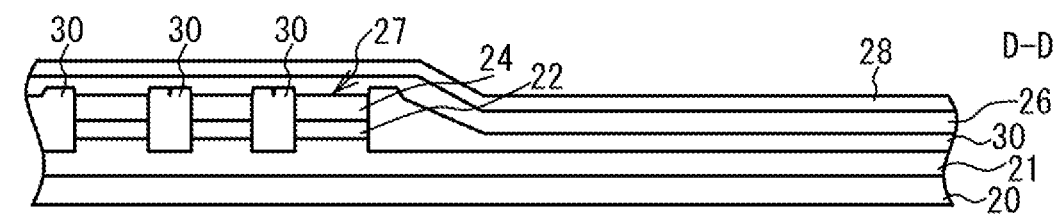
FIG. 5D is a sectional view illustrating the example method for manufacturing a semiconductor optical device.

The mesas 32, 34, 23 and 27 are embedded on both sides in the embedding layer 30. For example, as shown in FIG. 4A, the embedding layer 30 is flat at positions near and away from the mesa 32 and has inclined surfaces therebetween. The embedding layer 30 is thicker near the mesa 32 and becomes thinner away from the mesa 32. The thickness T1 of the embedding layer 30 within a distance of 5 μm from the mesa 32 is, for example, within ±0.2 μm from the height of the mesa 32. The thickness T2 of the embedding layer 30 at a position 20 μm or more away from the mesa 32 is, for example, 0.6 μm. The thickness of the embedding layer 30 in FIG. 4B is similar. In FIGS. 4C and 4D, the embedding layer 30 is located between the mesas 23 and 27 and has a thickness similar to those of the mesas 23 and 27. In FIG. 4C, very small depressions are formed in the centers of the upper portions of the embedding layer 30 between the mesas 23. In FIGS. 4A to 4D, the inclination of the inclined surfaces of the embedding layer 30 is determined by the growth direction of the semiconductor crystal forming the embedding layer 30, and the inclined surfaces are substantially perpendicular to the growth direction.

As shown in FIGS. 5A to 5D, after the mask 40 is removed, the cladding layer 26 and the contact layer 28 (second semiconductor layer) are epitaxially grown in sequence on the mesas 32, 34, 23 and 27 and the embedding layer 30, for example, by OMVPE. The cladding layer 26 and the contact layer 28 extend along the surfaces of the mesas 32, 34, 23 and 27 and the embedding layer 30. The surface of the contact layer 28 is flat within a distance of, for example, 5 μm from the mesas 32, 34, 23 and 27, is flat at positions, for example, 20 μm or more away from the mesas 32, 34, 23 and 27, and is inclined therebetween.

Figure 7A:
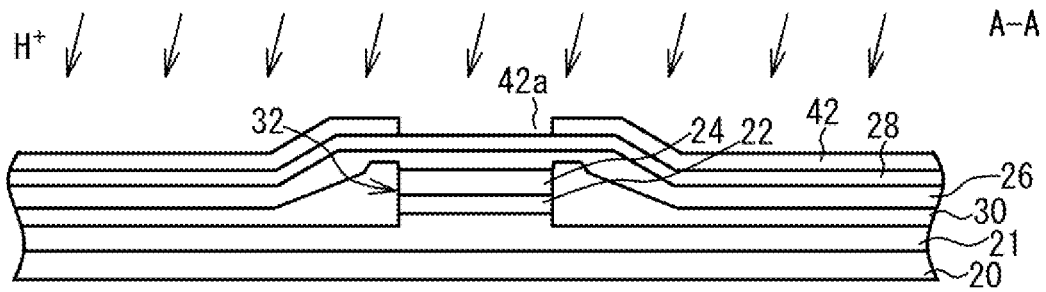
FIG. 7A is a sectional view illustrating the example method for manufacturing a semiconductor optical device.
Figure 7B:
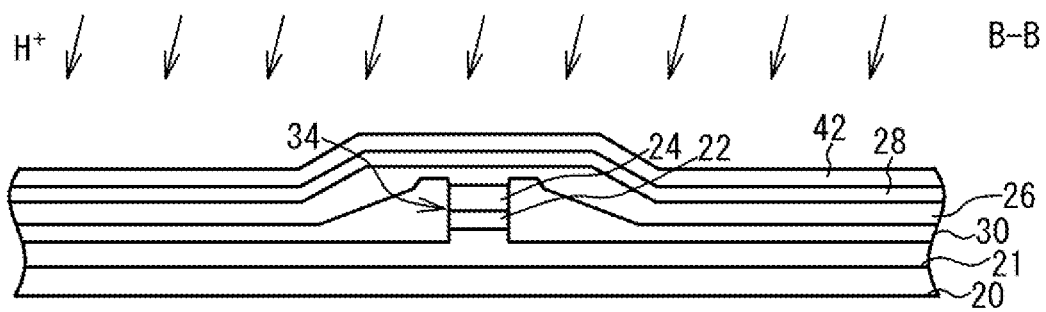
FIG. 7B is a sectional view illustrating the example method for manufacturing a semiconductor optical device.
Figure 7C:
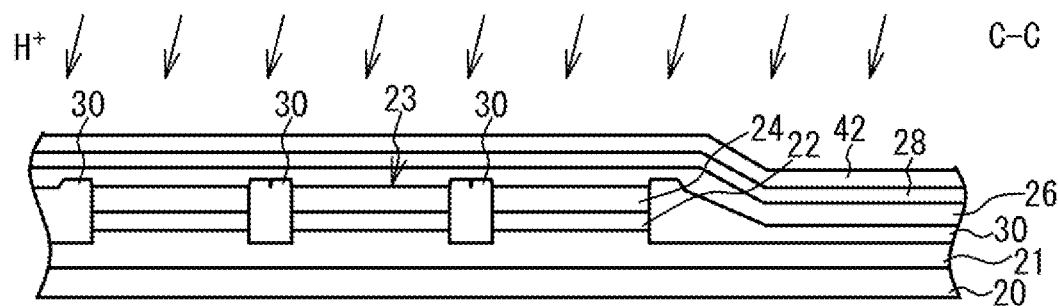
FIG. 7C is a sectional view illustrating the example method for manufacturing a semiconductor optical device.
Figure 7D:
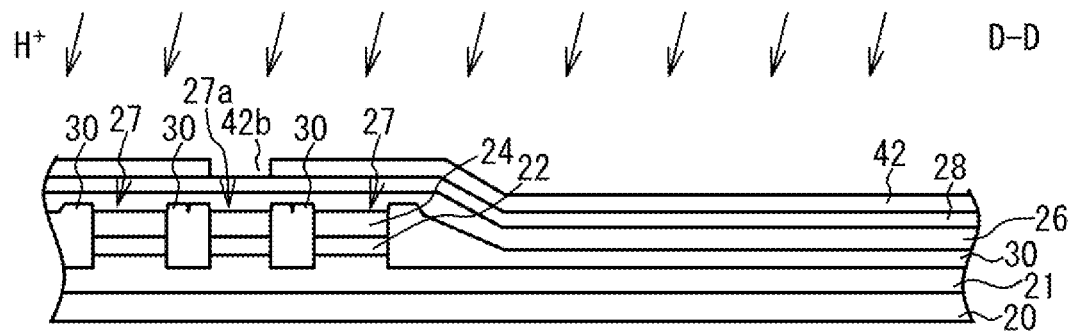
FIG. 7D is a sectional view illustrating the example method for manufacturing a semiconductor optical device.

As shown in FIGS. 6 to 7D, a mask 42 is provided on the contact layer 28. As shown in FIG. 7A, the mask 42 has openings 42a at positions overlapping the mesa 32. The contact layer 28 is exposed from the openings 42a. As shown in FIG. 7D, the mask 42 has openings 42b at positions overlapping one of the plurality of mesas 27 (mesa 27a). The contact layer 28 is exposed from the openings 42b. The portion other than the mesa 27a is covered by the mask 42. As shown in FIGS. 7B and 7C, the mesas 34 and 23 are covered by the mask 42.

After the formation of the mask 42, for example, ions such as hydrogen ions ($H^+$, protons) are implanted. The ions are implanted in a direction inclined at an angle of, for example, 7° with respect to the direction in which the mesas 32, 34, 23 and 27 extend. The ion implantation forms high-resistance regions in the mesas 32 and 27. No ions are implanted into the portion covered by the mask 42.

As shown in FIGS. 8A to 8D, a portion of the contact layer 28 is removed, for example, by etching. As shown in FIG. 8A, the contact layer 28 remains on the mesa 32. As shown in FIGS. 8B to 8D, the contact layer 28 is removed from the portion other than the mesa 32.

Figure 10A:
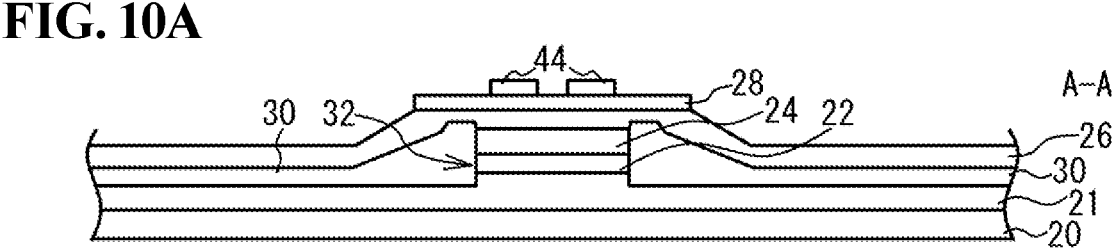
FIG. 10A is a sectional view illustrating the example method for manufacturing a semiconductor optical device.
Figure 10B:
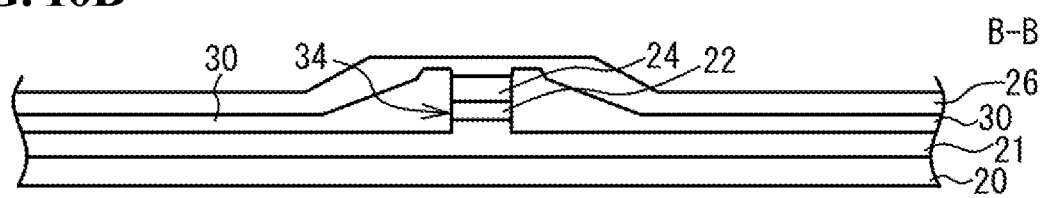
FIG. 10B is a sectional view illustrating the example method for manufacturing a semiconductor optical device.
Figure 10C:
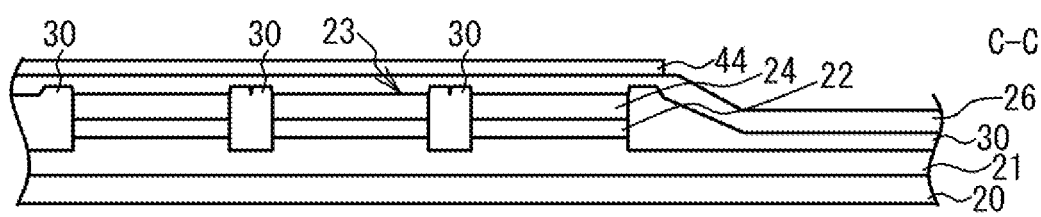
FIG. 10C is a sectional view illustrating the example method for manufacturing a semiconductor optical device.
Figure 10D:
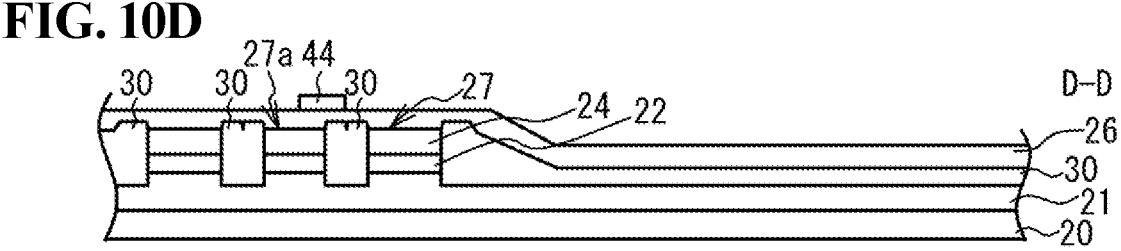
FIG. 10D is a sectional view illustrating the example method for manufacturing a semiconductor optical device.

As shown in FIG. 9, a mask 44 is provided on the portions in which the arm waveguides 14a and 14b, the splitter 12a, the combiner 12b, the spot-size converters 10 and 18, and the electrodes 16a and 16b are to be formed. As shown in FIG. 10A, two portions of the mask 44 are separated from each other and partially cover the mesa 32. As shown in FIG. 10B, the mask 44 is not provided on the scribe lines 11. As shown in FIG. 10C, the mesas 23 are covered by the mask 44. In FIG. 10D, the mask 44 is provided so as to partially overlap one of the plurality of mesas 27, namely, the mesa 27a.

Figure 11A:
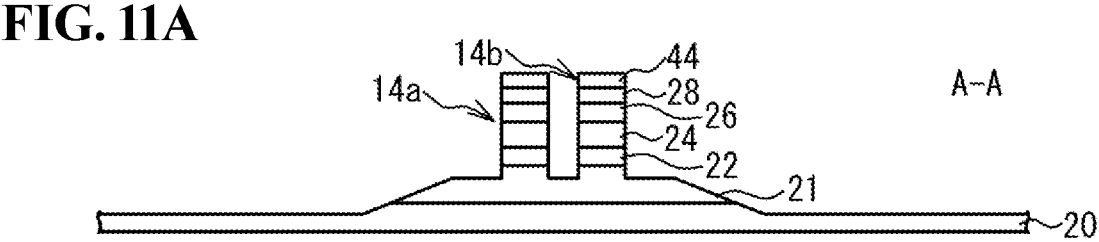
FIG. 11A is a sectional view illustrating the example method for manufacturing a semiconductor optical device.
Figure 11B:
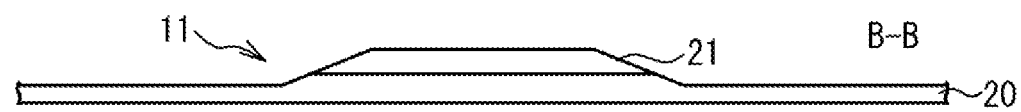
FIG. 11B is a sectional view illustrating the example method for manufacturing a semiconductor optical device.
Figure 11C:
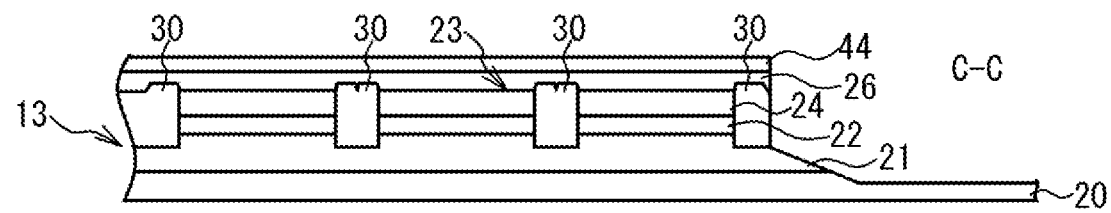
FIG. 11C is a sectional view illustrating the example method for manufacturing a semiconductor optical device.
Figure 11D:
FIG. 11D is a sectional view illustrating the example method for manufacturing a semiconductor optical device.

As shown in FIGS. 11A to 11D, the portions exposed from the mask 44 are removed by dry etching. As shown in FIG. 11A, the arm waveguides 14a and 14b (second mesa) are formed from the mesa 32, and the embedding layer 30 is removed. As shown in FIG. 11B, the mesa 34 and the embedding layer 30 are removed from the scribe lines 11, and the substrate 20 and the cladding layer 21 remain. As shown in FIG. 11C, the mesas 23 and the embedding layer 30 therebetween remain, and the portions of the cladding layer 26, the embedding layer 30, the cladding layer 21, and the substrate 20 that are exposed from the mask 44 are etched. As shown in FIG. 11D, the mesas 25 (second mesa) are formed from one of the plurality of mesas 27, namely, the mesa 27a, the embedding layer 30, and the cladding layer 26. The other mesas 27 are removed. The top surface formed after the removal of the embedding layer 30 is flat at positions away from the regions in which the top surface of the embedding layer 30 is flat (mesas 32, 34, 24, and 27). As shown in FIGS. 11A to 11D, the inclined surfaces of the embedding layer 30 are transferred to the cladding layer 21 and the substrate 20 as inclined surfaces. Thus, as shown in FIG. 11A, the arm waveguides 14a and 14b are disposed on the trapezoidal mesa having the inclined surfaces of the cladding layer 21 and the substrate 20.

The mask 44 is removed, and other layers such as an insulating film and a resin layer are provided. As shown in FIG. 1A, the electrodes 16a and 16b are provided on the regions 13. The wafer is cleaved along the scribe lines 11. Thus, the semiconductor optical device 100 is formed.

As shown in FIGS. 1D and 1E, the embedding layer 30 remains in the regions 13 and the spot-size converters 10 and 18. As shown in FIGS. 1B and 1C, the embedding layer 30 is removed from the other portions. Thus, the embedding layer 30 may be provided only in the regions 13 and the spot-size converters 10 and 18. However, to reduce the area over which the embedding layer 30 is provided, the mask 40 may be larger than that in the example shown in FIG. 2A. If the mask 40 has a large area, the embedding layer 30 may grow on the surface of the mask 40. Such abnormal growth may, for example, hinder the removal of the mask 40 in the subsequent process step. In addition, the embedding layer 30 may be raised at the ends of the mask 40, and the flatness of the embedding layer 30 may be decreased.

According to the first embodiment, the mesas 32, 34, 23, and 27 are formed, the mask 40 is formed thereon, and the embedding layer 30 is grown on both sides of each mesa. The embedding layer 30 is then etched to form the high-mesa arm waveguides 14a and 14b and the mesas 25 of the spot-size converters 10 and 18. Because the embedding layer 30 is formed over a large area, the area of the mask 40 can be reduced. Thus, the growth of the embedding layer 30 on the mask 40 can be inhibited.

The area of the mask 40 is, for example, 25% or less of the area of the substrate 20. Thus, the growth of the embedding layer 30 on the mask 40 can be effectively inhibited. The length of the mask 40 is preferably smaller than the diffusion distance of the source gases. The area of the mask 40 may account for, for example, 20% or less, or 30% or less, of the area of the substrate 20.

The embedding layer 30 is grown by OMVPE. Because the area of the mask 40 is small, the source gases for the embedding layer 30 flow over the mask 40 and is not easily deposited on the surface of the mask 40. Thus, the growth of the embedding layer 30 on the mask 40 is inhibited.

The n-type InP cladding layer 21, the AlGaInAs/AlInAs core layer 22, and the undoped InP/p-type InP cladding layer 24 are grown on the substrate 20. As shown in FIGS. 4A to 4D, the embedding layer 30 grows on the cladding layer 21. The embedding layer 30 is, for example, a semiconductor layer including InP and InGaAsP. The embedding layer 30 grows easily on the cladding layer 21, which is a semiconductor layer, but does not grow easily on the mask 40, which is an insulator. Thus, the abnormal growth of the embedding layer 30 can be inhibited. Other III-V compound semiconductors, for example, may also be used for the individual semiconductor layers.

As shown in FIGS. 5A to 5D, the cladding layer 26 and the contact layer 28 are grown on the mesas 32, 34, 23, and 27 and the embedding layer 30. The embedding layer 30 forms flat surfaces near the mesas 32, 34, 23, and 27 together with the mesas 32, 34, 23, and 27 and also has flat surfaces at positions 20 μm or more away from the mesas 32, 34, 23, and 27. The cladding layer 26 and the contact layer 28 grow along these surfaces and are therefore flat. Thus, the flatness of the semiconductor optical device 100 is improved. Accordingly, for example, the adhesion of layers such as an insulating film (not shown) and the electrodes 16a and 16b is improved.

As shown in FIGS. 7A to 7D, ions are implanted. Because the growth of the embedding layer 30 on the mask 40 is inhibited, the flatness is improved. In particular, the embedding layer 30 is formed on both sides of the mesas 32 and 27, which are to be implanted with ions. The embedding layer 30 forms flat surfaces together with the mesas 32 and 27. Thus, the depth of ion implantation becomes more uniform. The ion implantation is performed after the growth of the embedding layer 30 and the growth of the cladding layer 26 and the contact layer 28. After the ion implantation, high-temperature processes, for example, at several hundreds of degrees Celsius, are not performed. Thus, the escape of ions due to thermal processes is inhibited.

As shown in FIGS. 4A to 4D, the embedding layer 30 has the mesas 32, 34, 23, and 27 embedded therein. On the other hand, as shown in FIGS. 1B to 1E, after the process is completed, the embedding layer 30 remains in the regions 13 and the spot-size converters 10 and 18 and is removed from the arm waveguides 14a and 14b and the scribe lines 11. That is, the area over which the embedding layer 30 grows is larger than the area of the embedding layer 30 in the semiconductor optical device 100. Thus, the area of the mask 40 can be reduced, and the growth of the embedding layer 30 on the mask 40 can be inhibited.

Because the embedding layer 30 is removed from both sides of the arm waveguides 14a and 14b, light propagating through the arm waveguides 14a and 14b is less likely to leak into the embedding layer 30, thus improving the modulation efficiency. Because the embedding layer 30 is removed from the scribe lines 11, burrs are less likely to remain after cleavage, and straight surfaces can be obtained. Because the mesas 23 and the embedding layer 30 are formed in the regions 13, large flat surfaces can be formed. Thus, the electrodes 16a and 16b can be stably provided. In addition, because there is a large distance between the electrodes 16a and 16b and the cladding layer 21, the parasitic resistance is reduced, thus enabling high-speed modulation. Because the mesa 25 including the embedding layer 30 is formed in the spot-size converter 10, light can be expanded.

SECOND EMBODIMENT

Figure 12A:
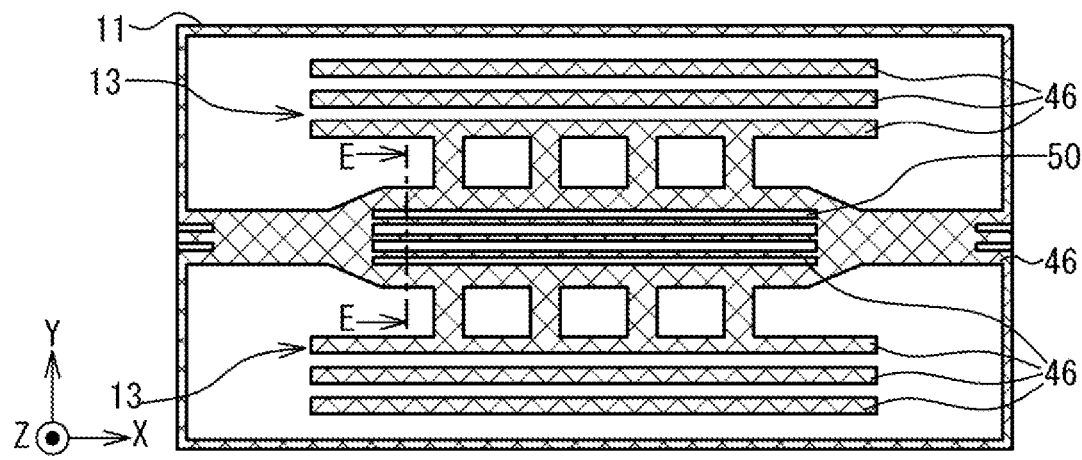
FIG. 12A is a plan view illustrating an example method for manufacturing a semiconductor optical device according to a second embodiment.
Figure 12B:
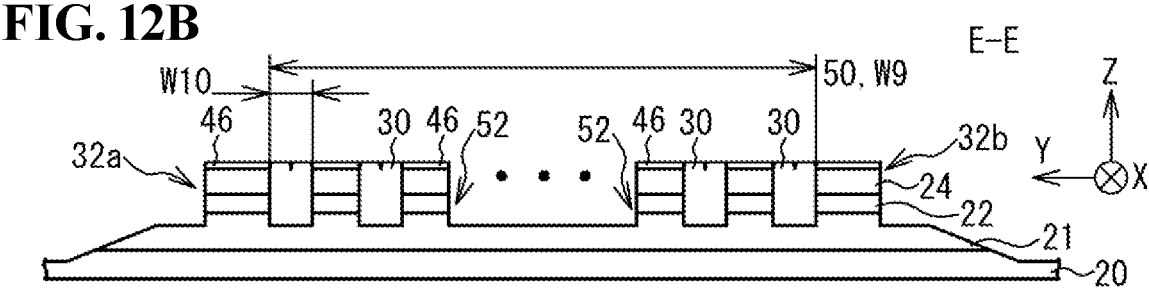
FIG. 12B is a sectional view illustrating the example method for manufacturing a semiconductor optical device.

FIG. 12A is a plan view illustrating an example method for manufacturing a semiconductor optical device according to a second embodiment, corresponding to the step of the first embodiment in FIGS. 2A to 2D. FIG. 12B is a sectional view illustrating the example method for manufacturing a semiconductor optical device, showing a cross-section taken along line E-E in FIG. 12A.

As shown in FIG. 12A, a terrace 50 is formed between the arm waveguides 14a and 14b. As shown in FIG. 12B, mesas 32a and 32b branch off from the mesa 32 shown in FIG. 3A. The terrace 50 is formed between the mesas 32a and 32b. The mesas 32a and 32b include the cladding layer 21, the core layer 22, and the cladding layer 24. The terrace 50 includes a plurality of portions of the embedding layer 30 and a plurality of mesas 52. The mesas 52 are formed from the cladding layer 21, the core layer 22, and the cladding layer 24. The width W9 of the terrace 50 is, for example, 300 μm. The width W10 of the embedding layer 30 is, for example, 10 μm.

Figure 12C:
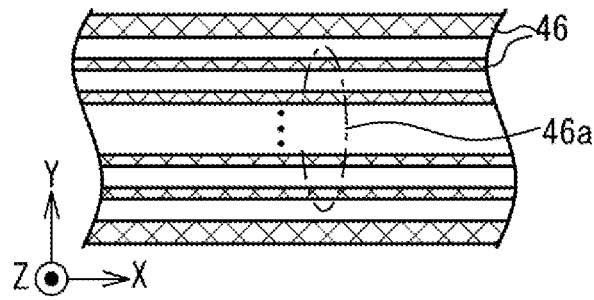
FIG. 12C is an enlarged plan view of a mask.
Figure 12D:
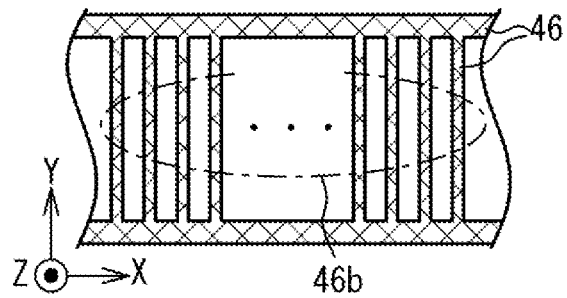
FIG. 12D is an enlarged plan view of a mask.

In the second embodiment, a mask 46 is used instead of the mask 40. FIGS. 12C and 12D are enlarged plan views of two types of masks 46, one of which is used. In FIG. 12C, the mask 46 has stripe portions 46a arranged in the Y-axis direction. In FIG. 12D, the mask 46 has stripe portions 46b arranged in the X-axis direction.

In FIGS. 12A and 12B, the mask 46 in FIG. 12C is used. The mesas 32a and 32b and the plurality of mesas 52 are formed under the mask 46 by dry etching corresponding to the process shown in FIGS. 3A to 3D. The embedding layer 30 is epitaxially grown between the mesas 52. The thickness of the embedding layer 30 is within about ±0.2 μm from the height of the mesas 52. The surface of the terrace 50 is nearly flat. The other steps are the same as those of the first embodiment. The mask 46 in FIG. 12D can also be used to form the terrace 50 including the plurality of mesas 52 and the embedding layer 30.

According to the second embodiment, because the mask 46 has the stripe portions 46a or 46b, the mask 46 has a smaller area than, for example, a mask covering the entire terrace 50. Thus, the growth of the embedding layer 30 on the mask 46 can be inhibited. In addition, because the terrace 50 is provided, heat dissipation is improved. Because the flat terrace 50 is provided between the arm waveguides 14a and 14b, the terrace 50 has high adhesion to, for example, an insulating film and a metal layer.

Figure 13A:
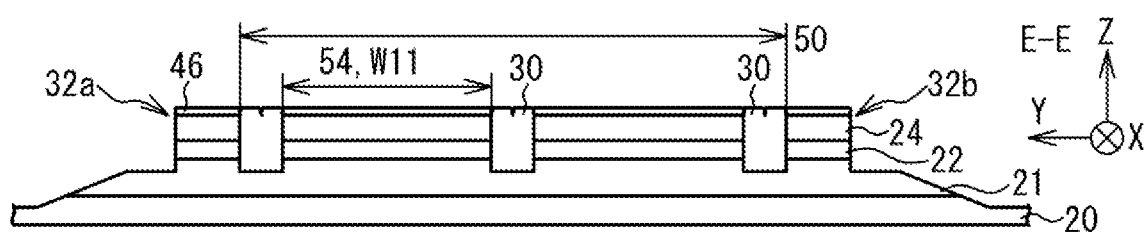
FIG. 13A is a sectional view illustrating an example method for manufacturing a semiconductor optical device according to a modification of the second embodiment.

Next, a modification of the second embodiment will be described. FIG. 13A is a sectional view illustrating an example method for manufacturing a semiconductor optical device, showing a cross-section corresponding to line E-E in FIG. 12A. As shown in FIG. 13A, the terrace 50 includes the embedding layer 30 and a plurality of mesas 54. The width W11 of the mesas 54 is, for example, 100 μm.

Figure 13B:
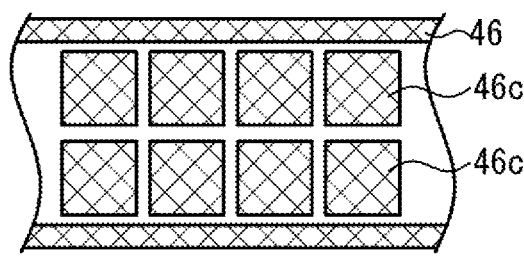
FIG. 13B is an enlarged plan view of a mask.

FIG. 13B is an enlarged plan view of the mask 46. The mask 46 includes a plurality of square portions 46c. The mesas 54 are formed under the square portions 46c by dry etching. The embedding layer 30 is grown between the mesas 54. The other steps are the same as those of the first embodiment. According to the modification, the mask 46 has the square portions 46c and therefore has a smaller area than a mask covering the entire terrace 50. Thus, the growth of the embedding layer 30 on the mask 46 can be inhibited.

Although certain embodiments of the present disclosure have been described in detail above, the disclosure is not limited to these embodiments. Rather, various changes and modifications can be made within the spirit of the disclosure as set forth in the claims.

What is claimed is:

1. A method for manufacturing a semiconductor optical device, comprising the steps of:
   forming a first semiconductor layer on a substrate;
   forming a mask on the first semiconductor layer;
   forming a first mesa from the first semiconductor layer using the mask;
   forming an embedding layer on a portion of the first semiconductor layer that is exposed from the mask such that the first mesa is embedded in the embedding layer;
   forming a second semiconductor layer on the first semiconductor layer and the embedding layer, and
   forming a second mesa from the first mesa and the second semiconductor layer.

2. The method for manufacturing a semiconductor optical device according to claim 1, wherein an area of the mask is 25% or less of an area of the substrate.

3. The method for manufacturing a semiconductor optical device according to claim 1, wherein the step of forming the embedding layer is a step of forming a compound semiconductor layer as the embedding layer by organometallic vapor phase epitaxy.

4. The method for manufacturing a semiconductor optical device according to claim 1, wherein
   the first semiconductor layer includes, in sequence, a lower cladding layer, a core layer, and an upper cladding layer, and
   the embedding layer is formed on the lower cladding layer.

5. The method for manufacturing a semiconductor optical device according to claim 1, further comprising a step of implanting ions into the first semiconductor layer after the step of forming the embedding layer and before the step of forming the second mesa.

6. The method for manufacturing a semiconductor optical device according to claim 1, wherein the first mesa and the second mesa are formed in regions of the semiconductor optical device in which an arm waveguide, a scribe line, and an electrode are to be formed and in a portion of the semiconductor optical device that is to become a spot-size converter,
   the method further comprising a step of removing the embedding layer from the waveguide and the scribe line after the step of forming the second mesa.

7. A semiconductor optical device, comprising:
   a substrate;
   a trapezoidal mesa formed on the substrate;
   an arm waveguide formed on the trapezoidal mesa, the arm waveguide having a high-mesa structure and a semiconductor layer including a core layer;
   a region in which an electrode is formed over the substrate; and
   an embedding layer formed on the substrate;
   wherein the region in which the electrode is formed includes a plurality of first mesas formed on the substrate and the embedding layer, the embedding layer being formed between the plurality of first mesas.

8. The semiconductor optical device according to claim 7, further comprising a spot-size converter formed on the substrate and optically coupled to the arm waveguide,
   wherein the spot-size converter has a mesa shape with the core layer on one side and the embedding layer on an opposite side.

9. A semiconductor optical device comprising:
   a substrate;
   an embedding layer formed on the substrate;
   a trapezoidal mesa formed on the substrate;
   an arm waveguide formed on the trapezoidal mesa, the arm waveguide having a high-mesa structure and a semiconductor layer including a core layer; and
   a spot-size converter formed on the substrate and optically coupled to the arm waveguide,
   wherein the spot-size converter has a mesa shape with the core layer on one side and the embedding layer on an opposite side.

* * * * *